Patented June 12, 1923.

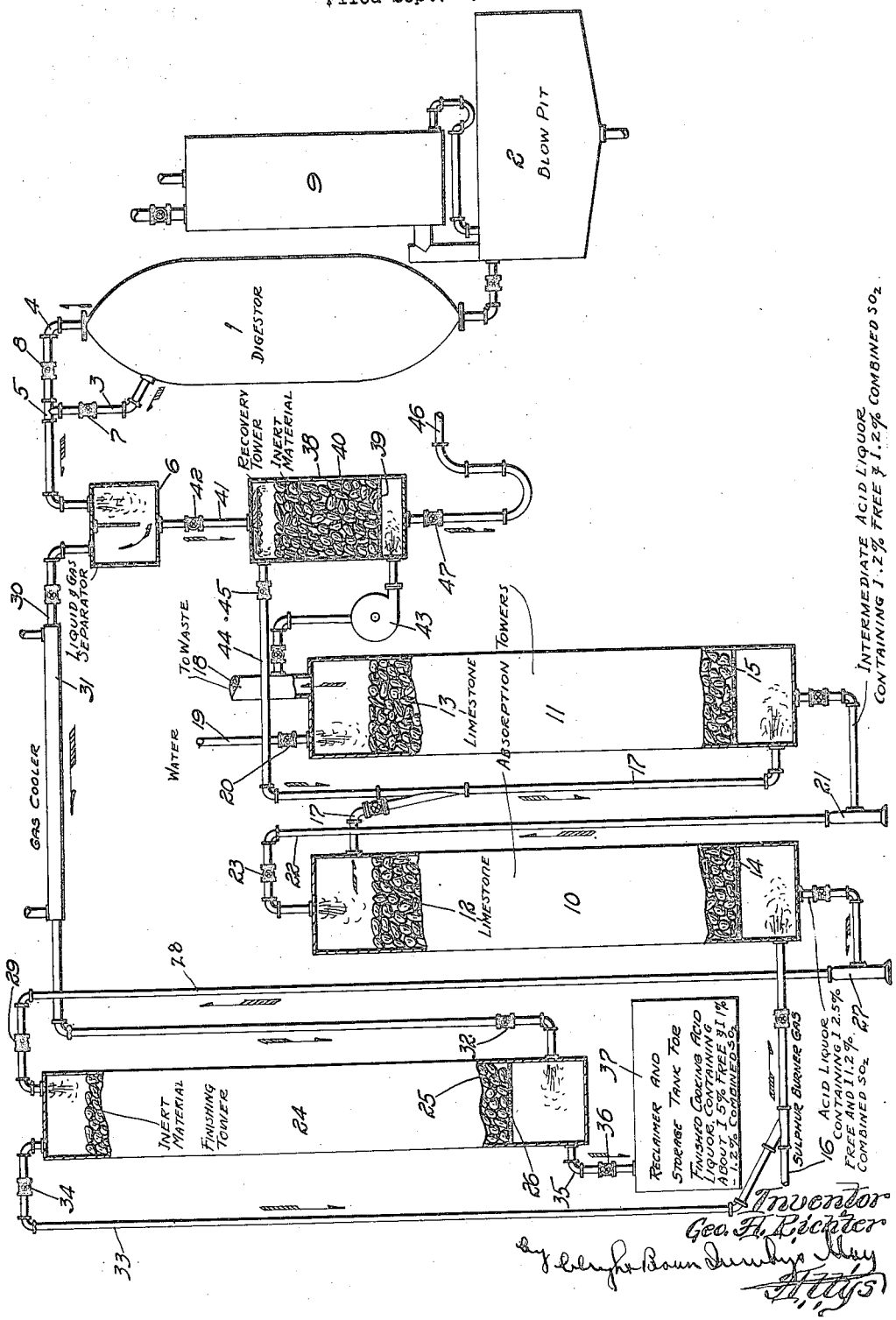

1,458,310

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

PROCESS OF MAKING SULPHITE LIQUOR.

Application filed September 3, 1920. Serial No. 408,052.

*To all whom it may concern:*

Be it known that I, GEORGE A. RICHTER, a citizen of the United States, residing at Berlin, in the county of Coos and State of New Hampshire, have invented new and useful Improvements in Processes of Making Sulphite Liquor, of which the following is a specification.

The object of the present invention is to provide a method for the recovery and utilization of sulphur dioxide from the relief liquors issuing from those digesters which are used for the cooking of the raw material in the manufacture of sulphite pulp.

The accompanying drawing illustrates more or less conventionally a system for the making of raw acid liquor (e. g. calcium bisulphite) and an apparatus for the recovery of sulphur dioxide from the relief liquor and its introduction into the raw acid liquor system.

One of the purposes, for which the invention is particularly intended, is to so utilize the sulphur dioxide recovered from the relief liquor that it shall not have the effect of diluting the free $SO_2$ content of the finished cooking acid liquor, when it is introduced into the acid liquor-making system, and also to assist in the production of a cooking liquor rich in free $SO_2$ without the refrigeration of the liquor used for absorbing or combining with the $SO_2$.

I have shown a digester 1, below pit 2, relief pipes 3 and 4 leading from the upper portion of the digester and connected by a coupling 5, and a separator 6 for separating the relief gas from the liquor. The two pipes 3 and 4, which are, as usual, screened (not shown) at their inlets to prevent the entrance of pulp, are provided with the valves 7 and 8 as ordinarily. At 9 I have shown conventionally a direct condenser which serves as a part of a recovery system (forming no part of the present invention) by which sulphur dioxide is recovered from the blow pit vapors and gases. I have not shown the various connections by which acid liquor and steam are introduced into the digester, as these are all well known and may be of common construction. The system, as it may be termed for producing the raw acid liquor, comprises two towers 10, 11, which form a part, and in which sulphur dioxide is absorbed and combined to form what may be termed a "raw" calcium bisulphite liquor containing a relatively small proportion of free sulphurous acid. These towers may be arranged for the introduction of milk of lime, but, as shown, they contain a calcium-bearing material such as lime stone, dolomite or the like, as indicated at 12 and 13, supported by perforated partitions 14, 15. Cooled and purified sulphur-burner gases are introduced into the lower end of tower 10 by a pipe or conduit 16, leading from the cooling apparatus by which the hot burner gases are cooled and more or less purified. These gases are caused to pass through the absorption towers 10, 11, in series, by a pipe 17 leading from the upper portion of tower 10 to the lower portion of tower 11. The tail gases from tower 11 are wasted through the outlet pipe 18. Water introduced into tower 11 by pipe 19, valved as at 20, is caused to flow in counter current to the flow of the gases through the towers in series, being pumped by a pump 21 from the bottom of tower 11 to the top of tower 10 through the intermediate connecting pipe 22, which has a regulating valve 23. These parts constitute one form of what I herein refer to as a system for producing the raw sulphite solution.

There is a third tower (the finishing or relief tower) 24, in which the raw bisulphite liquor is enriched with free sulphur dioxide gas, from the digester relief liquor, and which for the purpose contains a mass of inert interstitial surface material 25 (e. g. spiral brick, fragments of field rock or their equivalent), supported on a perforated partition 26. The raw acid liquor (calcium bisulphite) from the tower 10 is forced by pump 27 through pipe 28, having a regulating valve 29 to the top of tower 24, and the relief gas from the separator 6 is conducted by pipe 30 to the bottom of tower 24. The pipe 30 passes through a suitable cooler 31, and has a regulating valve 32. The tail gas from the finishing tower 24, which contains from 20 to 40% (by volume) sulphur dioxide, may be delivered by a pipe 33, valved as at 34 to the pipe 16 leading from the sulphur-burning and gas-cooling system. The finished acid liquor is delivered from tower 24 by a pipe 35, valved at 36, to a storage tank 37 from which it is withdrawn as needed for use in the digesters.

A portion of the tail gas from the absorption towers 10, 11 of the sulphite-producing system is employed to treat the hot relief liquor delivered by the separator 6 and to free it from its uncombined $SO_2$ content, and the tail gas thus enriched is recirculated through a portion of the raw acid liquor system. This forms an important feature of the present invention. As shown, I employ a recovery tank or tower 38, having a perforated partition 39 on which is supported a mass of inert interstitial surface material 40 (such as hereinbefore described), and the relief liquor is conducted from the separator by a pipe 41 (valved as at 42) to a spray nozzle or distributer in the top of the tower. A fan 43 is employed to force a portion of the tail gas from the exit conduit 18 of tower 11 to the bottom of the recovery tank or tower 38 so as to flow through the mass of inert material in direct contact with and in counter direction to the flow of relief liquor therethrough to sweep the free $SO_2$ therefrom. The enriched tail gas is conducted by a pipe 44 (having a valve 45) from the top of the recovery tower 38, to the raw acid liquor system, its delivery end being shown as connected to the gas conduit 17, between the towers 11 and 10, so that it will be commingled and mixed with the unabsorbed gases flowing from tower 10 to tower 11. The relief liquor, which has been substantially freed from uncombined $SO_2$, is conducted from the recovery tower 38 by a trapped pipe 46 valved as at 47.

In explanation of the process which is practiced by aid of the apparatus thus described, I may state, first, that it is my object to secure a finished acid liquor having a high content, say 5%, of free sulphurous acid, and to secure an economy of operation by utilizing uncombined $SO_2$ found in the separated relief liquor in enriching tail gas from the raw acid liquor, and to deliver such enriched gas to the raw acid liquor at a point where the unabsorbed burner gas is of approximately the same strength in $SO_2$. The cooled burner gas delivered through pipe 16 has a content of approximately 18% $SO_2$, whereas the unabsorbed gases, passing from the absorption tower 10, has a content of approximately 1% to 4% $SO_2$. The relief liquor from separator 6, at a temperature of about 210° F., contains about 0.2% combined and 0.3% to 1.0% free $SO_2$, whereas the relief gas fom the separator has a content of approximately 90% to 100% $SO_2$.

In the present process, the tail gas from the absorption towers, which contains little or no free $SO_2$ and consists principally of nitrogen and a small proportion (say 3%) of oxygen, is conducted through the recovery tower 38, where it is enriched by the recovery of free $SO_2$ from the relief liquor, to a point where it contains from 1.0% to 4.0% $SO_2$, and it is returned to the raw acid liquor in such manner as not to dilute the relatively rich burner gas, but to be commingled or mixed with gas of an approximately like strength and recirculated through the second tower 11 of the series. The waste relief liquor from the recovery tower, under proper regulation, contains ordinarily only from 0.2% to 0.3% total $SO_2$, so that the loss of sulphur is reduced to the minimum. Furthermore, by the use of tail gas for the recovery of free $SO_2$ from the relief liquor, the small percentage of oxygen therein (it consisting principally of inert gas-nitrogen) prevents oxidation of the free $SO_2$ in the relief liquor. I should not consider it a departure from the spirit and scope of my invention if the $SO_2$ were recovered from the relief liquor by any other method, and delivered to the acid system at some portion thereof which corresponds to an equilibrium determined by the concentration of $SO_2$ in the gas leaving the recovery tower. According to the process as herein described, the raw sulphite liquor from the tower 10 contains about 2.5% free and 1.2% combined $SO_2$, and, in the final or finished acid tower 24, the resultant acid liquor has a content of about 5% free and 1% to 1.2% combined $SO_2$. The tail gas from the last-mentioned tower 24 has a content of about 20% to 40% $SO_2$, and this, as previously stated, is commingled with the burner gas and recirculated through the absorption towers wherein the raw sulphite liquor is produced.

The process as hereinbefore described possesses the additional advantages:—

First.—By preventing the dilution of finished cooking acid liquor by a relatively large volume (30%) of warm dilute relief acid liquor, it allows the manufacture, under summer conditions, of a cooking acid liquor containing as high as 5% free $SO_2$, without very material loss of sulphur contained in the extracted hot relief liquor.

Second.—By freeing the hot relief liquor of available sulphur dioxide, I am able to discard ligneous products resulting from the cooking operation, and hence the cooking acid liquor will always be clean and free from appreciable amounts of organic material.

Third.—In the ordinary acid liquor producing system, wherein a relief separator is employed, it is necessary to install an elaborate cooling system for the hot corrosive relief liquor. In the apparatus herein described, inasmuch as the relief liquor is delivered as a waste product from the bottom of tower 38, it need not be cooled. Consequently, the usual elaborate lead cooling apparatus can be eliminated.

What I claim is:—

1. A process of making sulphite cooking liquor, which comprises producing a sulphite solution by an absorption system, separating the gases from the hot liquor relieved from the digester, cooling the strong gas thus separated, absorbing sulphur dioxide from the cooled strong gas, recovering free sulphur dioxide from the remaining hot relief liquor, and passing such recovered sulphur dioxide into the said system where the strength of the gas in said system is approximately that of the recovered gas.

2. A process of making sulphite cooking liquor, which comprises producing a sulphite solution by an absorption system, recovering uncombined sulphur dioxide gas from relief liquor delivered from the digester by passing tail gas from the said system through the relief liquor.

3. A process of making sulphite cooking liquor, which comprises producing a sulphite solution by an absorption system, recovering uncombined sulphur dioxide gas from relief liquor delivered from the digester by circulating tail gas from the said system through the relief liquor, and passing such enriched tail gas back to the said system at a point where the gas in the system has approximately the same sulphur dioxide content as the enriched tail gas.

4. A process of making sulphite cooking liquor, which comprises producing a sulphite solution by an absorption system, separating the gases from the hot liquor relieved from the digester, cooling the strong gas thus separated, absorbing sulphur dioxide from the cooled strong gas, recovering free sulphur dioxide from the remaining hot relief liquor, by passing tail gas from the said system through such relief liquor, and passing the enriched tail gas back to the said system at a point where the gas in the system has approximately the same sulphur dioxide content as the enriched tail gas.

5. A process of making sulphite cooking liquor having a high content of free sulphur dioxide, which comprises producing the sulphite solution by an absorption system, separating the gases from the hot liquor relieved from the digester, cooling the strong gas thus separated, recovering free sulphur dioxide from the remaining hot relief liquor and passing it into the absorption system at a point where the gas therein has approximately the same sulphur dioxide content, and enriching the sulphite liquor from the absorption system by causing it to absorb the cooled strong relief gas.

6. A process of making sulphite cooking liquor having a high content of free sulphur dioxide, which comprises producing a sulphite solution by an absorption system, separating the gases from the hot liquor relieved from the digester, cooling the strong gas thus separated, recovering free sulphur dioxide from the remaining hot relief liquor and passing it into the absorption system at a point where the gas therein has approximately the same sulphur dioxide content, enriching the sulphite liquor from the absorption system by causing it to absorb the cooled strong gas, and passing such of said gas as is not absorbed back into the absorption system.

In testimony whereof I have affixed my signature.

GEORGE A. RICHTER.